June 10, 1941.                    J. MIHALYI ET AL                    2,245,212
FOCUSING MECHANISM FOR CAMERAS
Filed Aug. 3, 1939
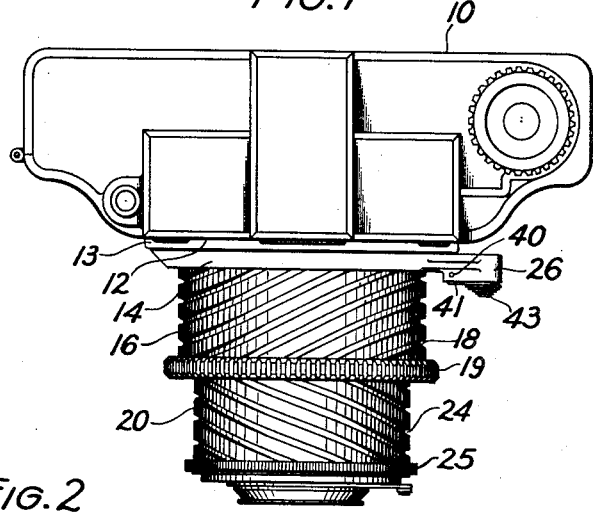
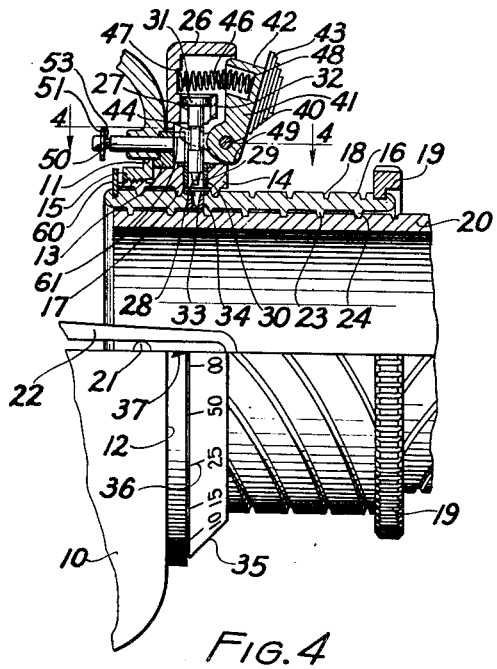
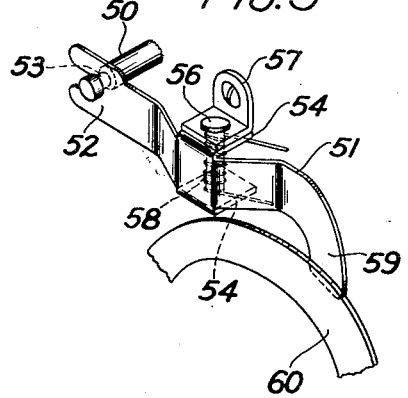
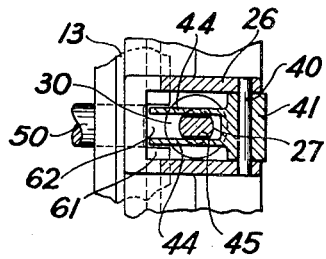
JOSEPH MIHALYI
ROBERT F. BLATTNER
INVENTORS
BY
ATTORNEYS Patented June 10, 1941

2,245,212

UNITED STATES PATENT OFFICE 2,245,212

FOCUSING MECHANISM FOR CAMERAS

Joseph Mihalyi and Robert F. Blattner, Rochester, N. Y., assignors to Eastman Kodak Company, Rochester, N. Y., a corporation of New Jersey Application August 3, 1939, Serial No. 288,180

19 Claims. (Cl. 95—45)

The present invention relates to photographic cameras having retractable focusing lens mounts, and particularly to the focusing mechanism for such lens mounts.

One object of the present invention is to provide a camera in which the focusing lens mount can be moved to and from retracted and extended positions relative to the camera body, and in which said lens mount is adapted to be focused by operation of a focusing ring carried by the camera body.

Another object is the provision of a camera of the type described in which the focusing ring on the camera can not be operatively connected to the focusing sleeve of the mount until the mount is moved to its extended position.

And still another object is to provide a releasable stop for preventing the connection of the focusing ring with the focusing sleeve of the mount, which stop is arranged to be automatically released by the focusing sleeve of the mount when the same is moved to its extended position.

And a further object is to provide a camera of the type described in which the focusing ring on the camera body cannot be rotated until it is operatively connected to the focusing sleeve of the lens mount.

And yet another object is to provide means whereby the means preventing rotation of the focusing ring is tied up with the means preventing a connection of the focusing sleeve and focusing ring so that the two are adapted to be released simultaneously, and preferably by movement of the focusing sleeve of the mount to its extended position.

And still a further object is to provide means whereby the focusing ring on the camera can be operatively connected to the focusing sleeve of the mount when, and only when, the focusing ring is in a predetermined position of adjustment, preferably when it is in position to indicate a focus at infinity.

And another object is to provide means whereby the focusing sleeve and focusing ring are positively held against disconnection during the time the focusing ring is removed from said predetermined position of adjustment.

And another object is to provide a lens mount made up of a focusing sleeve in threaded engagement with a focusing ring on the camera to move between extended and retracted positions relative to the camera when rotated through a given arc, and a lens mount in threaded engagement with said sleeve to be moved between extended and retracted positions relative thereto during movement of the sleeve between its two positions.

And another object is to provide a focusing arrangement of the type described which is simple in construction and operation, neat and compact in appearance, as well as foolproof in operation.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawing in which, Fig. 1 is a plan view of a photographic camera including a retractable focusing mount constructed in accordance with a preferred embodiment of the present invention, Fig. 2 is an enlarged side view of the front portion of the camera and the lens mount, partly in section and partly in elevation, showing the lens mount moved to its extended position, Fig. 3 is an enlarged perspective of the structure provided for permitting movement of the focusing sleeve to its extended position to withdraw the stop pin from the path of the bellcrank whereby the bellcrank can be moved to operatively connect the focusing sleeve and focusing ring and also release the focusing ring so that the same can be rotated, and Fig. 4 is an enlarged section taken substantially on line 4—4 of Fig. 2, and showing the manner in which the bellcrank is connected to the connecting pin and the manner in which the focusing ring is locked against rotation until the focusing sleeve and focusing ring are operatively connected together.

Like reference characters refer to corresponding parts throughout the drawing.

Referring now to the drawing, and particularly to Figs. 1 and 2, the camera body, indicated generally at 10, and which may be of any desired form so long as it is thick enough through to receive the lens mount when retracted thereinto, as will be hereinafter fully described, is provided with a circular opening 11 in its front wall 12. Fixed to the camera front surrounding the opening 11 therein is a bearing ring 13 in which the focusing ring 14 is rotatably retained by the retainer ring 15 screwed onto the end of the focusing ring extending into the camera body.

The focusing lens mount may comprise a focusing sleeve 16 adapted to be moved between an extended and retracted position relative to the front wall of the camera, and which may be in screw-threaded engagement with the focusing ring 14 to provide for this movement. The engaging threads 17 and 18 on the focusing ring and focusing sleeve, respectively, are preferably of the multiple acme type so that movement of the sleeve between its retracted and extended positions can be effected by a partial, or single, rotation of the sleeve in the proper direction. The forward end of the focusing sleeve may be provided with a knurled flange 19 to facilitate the operator gripping said sleeve to rotate the same.

In threaded engagement with the focusing sleeve is a lens tube 20, which tube may also carry the shutter, not shown, if a between-the-lens type of shutter is desired, and which tube is adapted to be moved into and out of the focusing sleeve between extended and retracted positions when said sleeve is rotated between its extended and retracted positions, respectively. So that the lens tube 20 will be moved into and out of the sleeve 16 by rotation of the sleeve, the tube is held against rotation by radially extending pins 21 spaced circumferentially thereof, only one of which is shown in Fig. 2, engaging and sliding in the slotted bracket 22 fixed to the camera body and extending forwardly of the lens tube. The engagement between the pins 21 and the slotted brackets 22 in addition to serving to arrange the lens tube to be extended and retracted by rotation of the focusing sleeve, also limit movement of the lens tube to one that is axial alone, and which type of movement is necessary for focusing purposes. The threaded engagement between the focusing sleeve 16 and the lens tube 20 preferably comprises multiple acme threads 23 on the inside of the sleeve and 24 on the outside of the lens tube and which threads are so calibrated relative to those on the outside of the sleeve 16 that the lens tube will be moved to and from its extended and retracted positions along with the movement of the sleeve between its extended and retracted positions when the latter is rotated relative to the focusing ring 14. The lens tube 20 may be provided on its forward end with one or more knurled flanges 25, but it is pointed out that these flanges are merely provided to carry out the design of the camera front when the sleeve and lens tube are moved to their retracted positions, and not for the purpose of gripping the lens tube because the movement of the latter is entirely controlled by movement of the focusing sleeve 16.

After the focusing sleeve 16 has been moved to its extended position it is adapted to be connected to the focusing ring 14 to rotate therewith, and this rotation of the sleeve moves the lens tube axially thereof for focusing. In order to connect the focusing sleeve 16 to the focusing ring 14 the following structure may be provided. Integral with the focusing ring and extending from the periphery thereof is a housing 26 in which is slidably mounted a connecting pin 27. One end 28 of this connecting pin 27 is tapered and extends into an opening 29 extending radially through the focusing ring 14 which opening may be provided with a bearing sleeve 30 to permit the connecting pin to slide through said opening. The other end of the connecting pin 27 may be enlarged as shown at 31 to slidably engage a guide 32 in the housing.

The focusing sleeve 16 is provided with a radially extending opening 33 which is adapted to be brought into alignment with the opening 29 in the focusing ring 14 when the focusing sleeve is moved to its extended position, see Fig. 2, and when the openings 29 and 33 are aligned the connecting pin 27 may be slid through the opening 29 and into the opening 33 to thereby connect the sleeve and ring against relative rotation. With the focusing ring and focusing sleeve connected in unison by the connecting pin 27 the rotation of the focusing ring will cause a rotation of the focusing sleeve and consequently an axial focusing adjustment of the lens tube relative to the sleeve for focusing purposes. The extent to which the connecting pin 27 moves into the opening 33 in the focusing sleeve 16 may be determined by the taper of the bearing sleeve 34 spun into said opening with relation to the taper at the end 28 of the pin, or opening 33 may be made smaller than the maximum outside diameter of the connecting pin so that the shoulder above the tapered portion will not pass into said opening 33. The exterior of the focusing ring 14 is provided with an inclined surface 35 and on which there is provided a focusing scale 36 which is adapted to cooperate with an index 37 on the bearing ring 13 to give an indication of the focus of the lens. Therefore, with this arrangement when the connecting pin is slid into the opening 23 in the focusing sleeve 16 the sleeve and ring are connected to rotate in unison so that focusing can be accomplished by rotating ring 14 and the focus can be read by referring the focusing scale 36 on the ring to the index 37.

Pivoted at 40 in the housing 26 is a bellcrank lever 41 one end 42 of which is rather large and is provided with a button 43, hereinafter referred to as the focusing button. The other end of the bellcrank lever includes two parallel spaced arms 44 which lie on opposite sides of the connecting pin 27 and engage cut-out portions 45 in said pin, see Figs. 2 and 4. When the bellcrank is moved to the position shown in Fig. 2, the connecting pin 27 is raised to its inoperative position, while, on the other hand, when the bellcrank is pivoted in the other direction the arms 44 of the bellcrank 41 will rotate downwardly to move the connecting pin 27 into its operative position. The bell crank 41 is normally moved to its connecting pin disengaging position by the coil spring 46 seated at one end in a recess 47 in the housing and at the other end a recess 48 in the arm 42 of the bellcrank lever. The pivoted movement of the bellcrank under the action of the spring 46 is limited by a protuberance 49 thereon, adjacent the pivot point thereof, which is adapted to engage the corner of the focusing ring as shown.

If the connecting pin 27 were moved toward its operative position before the focusing sleeve 16 was moved to its extended position, the tapered end 28 thereof could not engage the opening 33 in the sleeve but would only ride on the periphery of the sleeve to mark the surface and hinder an easy movement of said sleeve. It is therefore desirable with the present arrangement to prevent the connecting pin from being accidentally, or intentionally, moved to its operative position until the focusing sleeve has been moved to its full extended position.

To this end, the following locking arrangement is provided. Extending through and slidably mounted in the front wall of a camera body is a locking pin 50 which is adapted to move into and out of the housing 26 and into and out of the path of one or both ends of the arms 44 of the bellcrank 41 to prevent, or permit, the bellcrank to be pivoted in a direction to move the connecting pin 27 into operative position.

When this locking pin is slid into the path of the arms 44 the bellcrank cannot be pivoted, but when the locking pin is withdrawn, as shown in Fig. 2, the bellcrank 41 is free to pivot in a direction to move the connecting pin into operative position. Referring to Fig 3, movement of the locking pin 50 is controlled by the double-ended lever 51, the forked end 52 of which engages a groove 53 in the end of the locking pin extending into the camera. The lever 51 intermediate its end is provided with spaced turned down perforated ears 54 pivotally engaging the pivot pin 56 which is adapted to be fixed and spaced from the inside of the camera front wall by brackets 57. The lever 51 is normally pivoted in a direction to slide the locking pin 50 into the path of the arms 44 of the bellcrank by a spring 58 coiled about the pivot pin 56. So that the locking pin will be automatically retracted from its locking position when the focusing sleeve is moved to its extended position the other arm 59 of the double-ended lever 51 is arranged so as to extend adjacent the periphery of the focusing sleeve to be engaged by a flange 60 carried by the rear end of the focusing sleeve when said sleeve is moved to its extended position. Thus when the sleeve 16 is moved to its extended position the flange 60 thereon is adapted to engage the arm 59 of the double-ended lever 51 to pivot said lever against the action of the spring 58 a sufficient amount to withdraw the locking pin 50 from the locking position. With this arrangement, therefore, the instant the focusing sleeve 16 is moved from its extended position the locking pin 50 is moved into its locking position to prevent movement of the bellcrank 41 in a direction to move the connecting pin to its sleeve engaging position. The locking pin is held in this position until the focusing sleeve is moved to its extended position at which time the flange 60 on said sleeve engages and pivots the lever 51 to withdraw said locking pin.

No other means being provided for gripping the focusing ring 14, when the operator wishes to rotate the same for focusing he must grip the housing 26 and along with it the focusing button 43. In order to connect the focusing ring 14 and the focusing sleeve 16 together for focusing purposes the bellcrank 41 must be pivoted against the action of the spring, and this movement of the bellcrank will be accomplished by pressing the focusing button 43 toward the housing 26 whereby the focusing button and housing will look like a single element, as indicated in Fig 1 where the focusing button is shown in a position depressed toward the housing. Therefore, since the focusing button 43 must be gripped in order to focus, and the gripping action will involve a depression of said focusing button, it will be appreciated that the present arrangement provides for an unlocking of the bellcrank and a connection of the focusing sleeve and focusing ring in the proper order and incident to the focusing procedure.

The present invention provides means whereby the focusing ring 14 cannot be rotated unless it is connected to the focusing sleeve 16, and means whereby the focusing sleeve and focusing ring can be connected together and disconnected only when the focusing ring is in one of its extreme focusing positions, preferably the position indicating a focus at infinity.

To this end the bearing 13 is provided with a forwardly extending flange 61 which is adapted to overhang one, or both, of the ends of the arms 44 of the bellcrank lever 41, see Figs. 2 and 4. This flange is arranged so that it will engage the arms 44 to hold the bellcrank 41 in a connecting pin engaging position when the bellcrank is moved to this position and when the focusing ring is rotated from its infinity position. However, this flange is provided with a slot 62 which will align with the arms 44 of the bellcrank when the focusing ring is in its infinity position to permit said bellcrank to move to the position shown in Fig. 2 where it moves the connecting pin 27 to a disengaging position. When the bellcrank is in the position shown in Fig. 2 the arms 44 of the same extend into the path of the flange 61 so that rotation of the focusing ring is prevented, and it is this fact that permits the focusing sleeve to be rotated relative to the focusing ring between extended and retracted positions. In order to turn the focusing ring, the bellcrank 41 must be pivoted to a position where it will move the connecting pin into engaging position so that a connection of the focusing sleeve and focusing ring is insured before rotation of the ring can be effected. After the focusing ring has been turned from its infinity position the flange 61 will hold the bellcrank 41 in a connecting pin engaging position until the ring is returned to said infinity position at which time the arm 44 of the bellcrank 41 can pass through the slit 62 in the flange under the action of the spring 46 and the focusing sleeve and focusing ring will be disconnected. It will be appreciated that the latching means for the focusing ring has been tied in with the connecting pin engaging means so that all the operations necessary to focusing will be accomplished in the proper order through pressure upon the focusing button 43.

The operation of this focusing mechanism may be outlined as follows: Assuming that the lens mount is in a retracted position, the locking pin 50 will be spring pressed into a position to prevent connection of the focusing sleeve 16 to the focusing ring 14, and the focusing ring 14 will be locked against rotation by virtue of the arms 44 of the bellcrank 41 extending into the path of the flange 61 on the bearing ring. In order to bring the lens tube to a picture-taking position the focusing sleeve 16 is rotated relative to the focusing ring 14 until the flange 60 on the rear end thereof engages the arm 59 of the lever 51 and moves it against the rear end of the focusing ring. During this movement of the sleeve the lens tube 20 is automatically moved to its extended position and the locking pin 15 is withdrawn, and the bellcrank 41 is unlocked. Now as the focusing button 43 is touched for focusing, the bellcrank is pivoted to force the connecting pin 27 into the hole 33 in the focusing sleeve to connect the focusing ring to the focusing sleeve for focusing purposes, and at the same time the latching means for the focusing ring is released. When it is desired to close the camera, the focusing ring must be first returned to its infinity position whereupon the bellcrank 41 will pivot to the position shown in Fig. 2 under the action of the spring 46. Now as the focusing sleeve and lens tube are moved to their retracted positions by rotation of the sleeve relative to the focusing ring, and as soon as the sleeve leaves its extended position, the lever 51 under the action of the spring 58 will return the locking pin 50 into the path of the arms 44 of the bellcrank 41.

While we have shown the focusing sleeve and lens tube adapted to be moved to and from extended and retracted positions through the medium of a threaded engagement, it is pointed out that the present invention is not limited to the use of the same. It will be appreciated by anyone skilled in the art that the focusing sleeve can be axially slid to and from extended position in the focusing ring instead of being in threaded engagement therewith without affecting the novel features of the focusing mechanism. In the same sense it will be appreciated that the threaded engagement for extending or retracting the lens tube 20 into and out of the focusing sleeve 16 by movement of the latter between its two positions is merely a way of accomplishing the desired result easily and quickly, and that the novel features of the invention are not limited to this particular arrangement. In fact, since the novel features of the focusing mechanism constituting this invention do not depend on whether or not the lens tube itself is extended or not, let alone the means for accomplishing this extension, the lens tube could be fixed relative to the focusing sleeve, or moved by any suitable means relative thereto, without affecting the scope of the present invention.

The present invention provides a focusing mechanism for cameras having a retractable focusing lens mount adapted to be focused by a focusing ring on the camera body itself whereby the focusing sleeve of the mount cannot be connected to the focusing ring until the sleeve is moved to its full extended position. In fact the arrangement is such that the member for connecting the focusing sleeve and focusing ring cannot be moved toward its operative position accidentally, or intentionally, until the focusing sleeve is extended. It further provides that the focusing ring is locked in one of its extreme focusing positions against rotation during the time the same is not operatively connected to the focusing sleeve. The fact that the focusing ring and focusing sleeve can be connected together and disconnected only when the focusing ring is in one of its extreme focusing positions, namely the infinity position, insures that when the focusing ring is connected to the focusing sleeve, the focusing position indicated by the ring will correspond to the focus of the lens carried by the mount.

Although we have shown and described a certain specific embodiment of the present invention, we are fully aware that many modifications thereof are possible. Our invention, therefore, is not to be restricted except in so far as necessitated by the prior art and the spirit of the appended claims.

Having thus described our invention what we claim is new and desire to secure by Letters Patent of the United States is:

1. In a photographic camera the combination of a camera body, a focusing member movably mounted on said camera body, a focusing lens mount telescopically mounted relative to said focusing member to move into and out of said camera body between retracted and extended positions, respectively, and including a focusing sleeve adapted to be moved for focusing said mount, a releasable means for connecting said focusing sleeve to said focusing member whereby the former is adapted to be moved by the latter for focusing purposes, means normally acting on said releasable means to move it to an inoperative position, and means for preventing said releasable means from being moved from said inoperative position until said lens mount is moved to its extended position.

2. In a photographic camera the combination of a camera body, a focusing member mounted on said camera body to move between two extreme focusing positions, a focusing lens mount telescopically mounted relative to said focusing member to move into and out of said camera body between retracted and extended positions, respectively, and including a focusing sleeve adapted to be moved for focusing said mount, a releasable means for connecting said focusing sleeve to said focusing member whereby the former is adapted to be moved by the latter for focusing purposes, and normally moved to an inoperative position, means for preventing said releasable means from being moved from its inoperative position until said lens mount is moved to its extended position, and a latch mechanism for preventing movement of said focusing member until the same is connected to said focusing sleeve.

3. In a photographic camera the combination of a camera body, a focusing ring extending into and rotatable with respect to said camera body, a focusing sleeve telescopically mounted in said focusing ring to move into and out of said camera body between retracted and extended positions, respectively, a lens tube telescopically mounted in said focusing sleeve for focusing purposes, a driving connection between said focusing sleeve and said lens tube whereby rotation of said sleeve is adapted to move said lens tube axially thereof for focusing purposes, a releasable means for connecting said focusing sleeve to said focusing ring for rotation therewith, and normally moved to an inoperative position, and means for preventing said releasable means from being moved from its inoperative position until said focusing sleeve is moved to its extended position.

4. In a photographic camera the combination of a camera body, a focusing ring extending into and rotatable with respect to said camera body, a focusing sleeve telescopically and rotatably mounted in said focusing ring to move into and out of said camera body between retracted and extended positions, respectively, a lens tube telescopically mounted in said focusing sleeve for focusing purposes, a driving conection between said sleeve and said lens tube whereby rotation of said sleeve after reaching its extended position is adapted to move said lens tube axially thereof for focusing purposes, a releasable means for connecting the focusing ring and focusing sleeve against relative rotation, and normally moved to an inoperative position, and means for preventing said releasable means from being moved from its inoperative position until said focusing sleeve is moved to its extended position.

5. In a photographic camera the combination of a camera body, a focusing ring extending into and rotatable with respect to said camera body, a focusing sleeve telescopically and rotatably mounted in said focusing ring to move into and out of said camera body between retracted and extended positions, respectively, a lens tube telescopically mounted in said focusing sleeve to move into and out of the same between retracted and extended positions and for focusing movement beyond said extended position, a driving connection between said focusing sleeve and said lens tube whereby said lens tube is adapted to be moved between its extended and retracted positions by a given rotation of said focusing sleeve and for focusing purposes by further rotation of said focusing sleeve, a releasable means for connecting the focusing ring and focusing sleeve against relative rotation, and normally moved to an inoperative position, and means for preventing said releasable means from being moved from its inoperative position until said focusing sleeve is moved to its extended position.

6. In a photographic camera the combination of a camera body, a focusing ring extending into and rotatable with respect to said camera body, a locking means adapted to releasably hold said focusing ring against rotation from a position of adjustment indicating a focus at infinity, a focusing sleeve telescopically and rotatably mounted in said focusing ring to move into and out of said camera body between retracted and extended positions, respectively, a lens tube telescopically mounted in said focusing sleeve to move into and out of the same between retracted and extended positions and for focusing movement beyond said extended position, a driving connection between said focusing sleeve and said lens tube whereby said lens tube is adapted to be moved between its extended and retracted positions by a given rotation of said focusing sleeve and for focusing purposes by further rotation of said focusing sleeve, a releasable means for connecting the focusing ring and focusing sleeve against relative rotation and normally moved to an inoperative position, and means for simultaneously moving said locking means to its inoperative position and said releasable means to its operative position whereby a focusing of the lens tube can be effected through a rotation of said focusing ring, and means for preventing said releasable means from being moved from its inoperative position and said locking means from being moved from its operative position 7. In a photographic camera the combination of a camera body, a focusing ring extending into and rotatable with respect to said camera body, a locking means adapted to releasably hold said focusing ring against rotation from a position of adjustment indicating a focus at infinity, a focusing sleeve telescopically and rotatably mounted in said focusing ring to move into and out of said camera body between retracted and extended positions, respectively, a lens tube telescopically mounted in said focusing sleeve to move into and out of the same between retracted and extended positions and for focusing movement beyond said extended position, a driving connection between said focusing sleeve and said lens tube whereby said lens tube is adapted to be moved between its extended and retracted positions by a given rotation of said focusing sleeve, and for focusing purposes by further rotation of said focusing sleeve, a releasable means for connecting the focusing ring and focusing sleeve against relative rotation and normally moved to an inoperative position, and means for simultaneously moving said locking means to its inoperative position and said releasable means to its operative position whereby a focusing of the lens tube can be effected through a rotation of said focusing ring, and means for preventing said releasable means from being moved from its inoperative position and said locking means from being moved from its operative position, and means for preventing said locking means from moving to its operative position and said releasable means from moving to its inoperative position until said focusing ring is returned to a position of adjustment indicating a focus at infinity.

8. In a photographic camera the combination of a camera body, a focusing ring extending into and rotatable with respect to said camera body between two extreme focusing positions, a focusing sleeve telescopically mounted in said focusing ring to move into and out of said camera body between retracted and extended positions, respectively, a lens tube in threaded engagement with said focusing sleeve and adapted to be moved axially of said sleeve for focusing purposes by a rotation of the latter after the same has been moved to its extended position, means for releasably connecting said focusnig ring and said focusing sleeve against relative rotation when said ring is in one of its extreme focusing positions, and including a connecting member movable between an operative and a normally inoperative position, means for locking said connecting member in its inoperative position, and means for releasing said last mentioned means at the time said focusing sleeve reaches its extended position.

9. In a photographic camera the combination of a camera body, a focusing ring extending into and rotatable with respect to said camera body between two extreme focusing positions, a focusing sleeve telescopically mounted in said focusing ring to move into and out of said camera body between retracted and extended positions, respectively, a lens tube in threaded engagement with said focusing sleeve and adapted to be moved axially of said sleeve for focusing purposes by a rotation of the latter after the same has been moved to its extended position, means for releasably connecting said focusing ring and said focusing sleeve against relative rotation when said ring is in one of its extreme focusing positions, and including a connecting member movable between an operative and a normally inoperative position, means for locking said connecting member in its inoperative position, and means carried by said focusing sleeve adapted to actuate said last mentioned means when the focusing sleeve reaches its extended position to release said connecting member, whereby the same may be moved to its operative position to connect the focusing ring and focusing sleeve against relative rotation.

10. In a photographic camera the combination of a camera body, a focusing ring extending into and rotatable with respect to said camera body between two extreme focusing positions, a focusing sleeve telescopically mounted in said focusing ring to move into and out of said camera body between retracted and extended positions, respectively, a lens tube in threaded engagement with said focusing sleeve and adapted to be moved axially of said sleeve for focusing purposes by a rotation of the latter after the same has been moved to its extended position, means for releasably connecting said focusing ring and said focusing sleeve against relative rotation when said ring is in one of its extreme focusing positions, and including a connecting member movable between an operative and a normally inoperative position, means for locking said connecting member in its inoperative position, and means for releasing said last mentioned means at the time said focusing sleeve reaches its extended position, whereby said connecting member can be moved to its operative position to connect the focusing ring and focusing sleeve against relative rotation, and means for positively preventing movement of said connecting member to its inoperative position until said focusing ring is returned to said one of its extreme focusing positions.

11. In a photographic camera the combination of a camera body, a focusing ring extending into and rotatable with respect to said camera body between two extreme focusing positions, a focusing sleeve telescopically mounted in said focusing ring to move into and out of said camera body between retracted and extended positions, respectively, a lens tube in threaded engagement with said focusing sleeve and adapted to be moved axially of said sleeve for focusing purposes by a rotation of the latter after the same has been moved to its extended position, means for releasably connecting said focusing ring and said focusing sleeve against relative rotation when said ring is in one of its extreme focusing positions, and including a connecting member carried by said ring and movable between an operative and an inoperative position wherein it positively engages and disengages said sleeve, respectively, means normally moving said connecting member to its inoperative position, a stop member normally moved into the path of said connecting member to hold it in its inoperative position, and means carried by said focusing sleeve adapted to remove said stop member from holding position relative to said connecting member when said focusing sleeve is moved to its extended position.

12. In a photographic camera the combination of a camera body, a focusing ring extending into and rotatable with respect to said camera body between two extreme focusing positions, a focusing sleeve telescopically mounted in said focusing ring to move into and out of said camera body between retracted and extended positions, respectively, a lens tube in threaded engagement with said focusing sleeve and adapted to be moved axially of said sleeve for focusing purposes by a rotation of the latter after the same has been moved to its extended position, means for releasably connecting said focusing ring and said focusing sleeve against relative rotation when said ring is in one of its extreme focusing positions, and including a connecting member carried by said ring and movable between an operative and an inoperative position wherein it positively engages and disengages said sleeve, respectively, means normally moving said connecting member to its inoperative position, a stop member slidably mounted on said camera body to move into and out of the path of said connecting member for releasably holding the same in its inoperative position, a spring normally acting to slide said stop member into the path of said connecting member, means for sliding said stop member out of the path of said connecting member, and means carried by said focusing sleeve adapted to engage and operate said last mentioned means when said focusing sleeve is moved to its extended position whereby said connecting member can be moved to its operative position.

13. In a photographic camera the combination of a camera body, a focusing ring extending into and rotatable with respect to said camera body between two extreme focusing positions, a focusing sleeve telescopically mounted in said ring to move between a retracted and an extended position relative to said camera body, a lens tube in threaded engagement with said sleeve and adapted to be moved axially thereof for focusing purposes upon a rotation of said sleeve, releasable means for connecting said sleeve and said ring against relative rotation after said sleeve has been moved to its extended position, a releasable latch for holding said focusing ring in one of its extreme focusing positions until said releasable means is actuated to connect the sleeve and ring against relative rotation, and means for preventing a disconnection of said sleeve and ring except when said ring is returned to said one extreme focusing position.

14. In a photographic camera the combination of a camera body, a focusing ring extending into and rotatable with respect to said camera body between two extreme focusing positions, a focusing sleeve telescopically mounted in said ring to move between a retracted and an extended position relative to said camera body, a lens tube in threaded engagement with said sleeve and adapted to be moved axially thereof for focusing purposes upon a rotation of said sleeve, means for releasably connecting said sleeve and said ring against relative rotation and movable to and from an inoperative and an operative position when said sleeve is in its extended position and said ring is in one of its extreme focusing positions, said means including a connecting pin slidably carried by said ring to move from an inoperative position, wherein the ring and sleeve are capable of relative rotation, and an operative position, wherein the ring is connected to the sleeve to rotate therewith, means for locking said connecting pin against movement to its operative position until said sleeve is moved to its extended position, a pivoted lever carried by said ring and connected to said connecting pin for moving it between its operative and inoperative positions, a stop on said camera body, a member carried by said ring and movable into and out of the path of said stop when said ring is in one of its extreme focusing positions whereby rotation of said ring is alternately prevented and permitted respectively, means for holding said member out of the path of said stop during the time the ring is not in said one of its extreme focusing positions, means normally moving said lever to its inoperative position and said member into the path of said stop, said lever and said member interconnected to be operated simultaneously through the actuation of one thereof.

15. In a photographic camera the combination of a camera body, a focusing ring extending into and rotatable with respect to said camera body between two extreme focusing positions, a focusing sleeve telescopically mounted in said ring to move between a retracted and an extended position relative to said camera body, a lens tube in threaded engagement with said sleeve and adapted to be moved axially thereof for focusing purposes upon a rotation of said sleeve, means for releasably connecting said sleeve and said ring against relative rotation and movable to and from an inoperative and an operative position when said sleeve is in its extended position and said ring is in one of its extreme focusing positions, said means including a conecting pin slidably carried by said ring to move from an inoperative position, wherein the ring and sleeve are capable of relative rotation, and an operative position, wherein the ring is connected to the sleeve to rotate therewith, a pivoted bellcrank carried by said ring and connected to said connecting pin for moving it between its operative and inoperative positions, a stop on said camera, an extension on the arm of said bellcrank connected to said connecting pin adapted to be moved into the path of said stop when the bellcrank is moved to disengage said connecting pin to prevent relative rotation of said ring and sleeve, and adapted to be moved out of the path of said stop when the bellcrank is pivoted to move said connecting pin to its operative position, means on said camera body adapted to engage and hold said extension out of the path of said stop during the time the ring is not in said one of its extreme focusing positions, a spring normally acting on said bellcrank to disengage said connecting pin and move said extension into the path of said stop, a lock pin mounted on said camera body to slide into and out of the path of said bellcrank to prevent movement of the same from its normal position, and normally moved into the path of said bellcrank, means for sliding said lock pin from the path of said bellcrank, said means engaged and operated by a part carried by the focusing sleeve when said sleeve is moved to its extended position.

16. In a photographic camera the combination of a camera body, a focusing ring extending into and rotatable with respect to said camera body between two extreme focusing positions, a focusing sleeve telescopically mounted in said ring to move between a retracted and an extended position relative to said camera body, a lens tube in threaded engagement with said sleeve and adapted to be moved axially thereof for focusing purposes upon a rotation of said sleeve, means for releasably connecting said sleeve and said ring against relative rotation and movable to and from an inoperative and an operative position when said sleeve is in its extended position and said ring is in one of its extreme focusing positions, said means including a connecting pin slidably carried by said ring to move from an inoperative position, wherein the ring and sleeve are capable of relative rotation, and an operative position, wherein the ring is connected to the sleeve to rotate therewith, a pivoted bellcrank carried by said ring and connected to said connecting pin for moving it between its operative and inoperative positions, a stop on said camera, an extension on the arm of said bellcrank connected to said connecting pin adapted to be moved into the path of said stop when the bellcrank is moved to disengage said connecting pin to prevent relative rotation of said ring and sleeve, and adapted to be moved out of the path of said stop when the bellcrank is pivoted to move said connecting pin to its operative position, means on said camera body adapted to engage and hold said extension out of the path of said stop during the time the ring is not in said one of its extreme focusing positions, a spring normally acting on said bellcrank to disengage said connecting pin and move said extension into the path of said stop, a lock pin mounted on said camera body to slide into and out of the path of said bellcrank to prevent movement of the same from its normal position, a pivoted double-ended lever, one end of said lever engaging said lock pin to slide the same into and out of the path of said bellcrank, when the lever is pivoted, a spring normally acting to slide said lock pin into the path of said bellcrank, and a flange on the rear end of said focusing sleeve adapted to engage the other end of said lever when the sleeve is moved to its extended position whereby said lever is adapted to be pivoted to withdraw said lock pin from the path of said bellcrank.

17. In a photographic camera the combination of a camera body, a focusing ring extending into and rotatable with respect to said camera body between two extreme focusing positions, a focusing sleeve in threaded engagement with said focusing ring to move into and out of said camera body between a retracted and an extended position, a lens tube in threaded engagement with said focusing sleeve and held against rotation whereby a rotation of the focusing sleeve to and from its extended position is adapted to move the lens tube into and out thereof between extended and retracted positions relative thereto, and further rotation of the focusing sleeve after reaching its extended position is adapted to move said lens tube for focusing purposes, means for connecting said focusing sleeve and said focusing ring against relative rotation after said sleeve is moved to its extended position, said means including a connecting pin slidably carried by said ring and adapted to be moved into positive engagement with said sleeve, a pivoted bellcrank connected to said connecting pin for sliding the same to and from engagement with said sleeve, a spring normally acting on said bellcrank to withdraw said connecting pin from engaging position, a releasable stop means normally preventing movement of said bellcrank from its normal position, means carried by said sleeve for releasing said stop means when the sleeve is moved to its extended position, means on said camera body for engaging said bellcrank and preventing rotation of said focusing ring when said bellcrank is in its normal position, and means on said camera body adapted to engage and prevent a return of said bellcrank to its normal position until said focusing ring is in one of its extreme focusing positions for preventing a disconnection of the focusing sleeve and focusing ring.

18. In a photographic camera the combination of a camera body, a focusing ring rotatably mounted on said camera body to move between two extreme focusing positions, a focusing sleeve rotatably carried by said focusing ring, a lens tube carried by said sleeve and connected thereto to be moved axially for focusing purposes by a rotation of said sleeve, a releasable connecting means for connecting said ring to said sleeve for rotation therewith, a releasable latch for locking said ring against rotation from one of its extreme focusing positions, said releasable latch and said releasable connecting means interconnected whereby the latch cannot be released until the said ring is connected to said sleeve.

19. In a photographic camera the combination of a camera body, a focusing ring rotatably mounted on said camera body to move between two extreme focusing positions, a focusing sleeve rotatably carried by said focusing ring, a lens tube carried by said sleeve and connected thereto to be moved axially thereof for focusing purposes by a rotation of said sleeve, a releasable connecting means for connecting said ring to said sleeve for rotation therewith, a releasable latch for locking said ring against rotation from one of its extreme focusing positions, said releasable latch and said releasable connecting means interconnected whereby the latch cannot be released until said ring is connected to said sleeve, and means for positively holding said latch in a released position and said sleeve and ring connected together during the time said ring is removed from said one of its extreme focusing positions.

JOSEPH MIHALYI.
ROBERT F. BLATTNER.